US012711762B2

(12) United States Patent
Hunter et al.

(10) Patent No.: US 12,711,762 B2
(45) Date of Patent: Aug. 18, 2026

(54) SYSTEM FOR INSPECTING AND EVALUATING A GREEN INFRASTRUCTURE

(71) Applicant: Morgan State University, Baltimore, MD (US)

(72) Inventors: James G Hunter, Baltimore, MD (US); Jingwen Xue, Parkville, MD (US); Xuejun Qian, Parkville, MD (US)

(73) Assignee: Morgan State University, Baltimore, MD (US)

(*) Notice: Subject to any disclaimer, the term of this patent is extended or adjusted under 35 U.S.C. 154(b) by 2 days.

(21) Appl. No.: 18/734,702

(22) Filed: Jun. 5, 2024

(65) Prior Publication Data

US 2024/0404276 A1 Dec. 5, 2024

Related U.S. Application Data

(60) Provisional application No. 63/471,090, filed on Jun. 5, 2023.

(51) Int. Cl.

*G06V 20/10* (2022.01)
*G01J 5/00* (2022.01)

(Continued)

(52) U.S. Cl.

CPC .............. *G06V 20/188* (2022.01); *G01J 5/00* (2013.01); *G06T 7/0012* (2013.01); *G06V 10/56* (2022.01); *G06V 20/17* (2022.01); *G06V 20/194* (2022.01); *H04N 23/11* (2023.01); *H04N 23/13* (2023.01); *H04N 23/66* (2023.01); *G01J 2005/0077* (2013.01); *G06T 2207/10024* (2013.01); *G06T 2207/10032* (2013.01);

(Continued)

(58) Field of Classification Search

CPC .... G06V 20/188; G06V 10/56; G06V 20/194; G01J 5/00; G06T 7/0012

See application file for complete search history.

(56) References Cited

U.S. PATENT DOCUMENTS

| | | | | |
|---|---|---|---|---|
| 10,755,443 | B1 * | 8/2020 | Trundle | A01G 25/16 |
| 11,287,411 | B2 * | 3/2022 | Miresmailli | G01N 33/0098 |

(Continued)

*Primary Examiner* — Scott A Browne
*Assistant Examiner* — Jason Nguyen
(74) *Attorney, Agent, or Firm* — Peter J. Davis; Whiteford, Taylor & Preston, LLP

(57) ABSTRACT

A system for integrating state-of-the art of the facilities, Unmanned Aerial Vehicle, computer-based tools, quantitative standard values, optionally along with fuzzy logic, to assess GI performance based on factors such as plant density percentages, plant health condition, and invasive plant numbers. A UAV drone is used to take images above the plants and analyze the images to get plant density percentage for various GI sites. The Normalized Difference Vegetation Index (NDVI) value is calculated and used to analyze images and investigate plant health conditions. NDVI values between −1 and 0 correspond to non-plant surfaces, such as equipment, water, or soil. The higher the NDVI value, the greater their density and health. For counting invasive plant numbers, a machine/deep learning method may be applied to enhance invasive plant features to detect and enumerate invasive plants among normal plants in the captured images.

7 Claims, 11 Drawing Sheets
(9 of 11 Drawing Sheet(s) Filed in Color)

(51) Int. Cl.

*G06T 7/00* (2017.01)
*G06V 10/56* (2022.01)
*G06V 20/17* (2022.01)
*H04N 23/11* (2023.01)
*H04N 23/13* (2023.01)
*H04N 23/66* (2023.01)

(52) U.S. Cl.

CPC ............... *G06T 2207/10048* (2013.01); *G06T 2207/20132* (2013.01); *G06T 2207/30184* (2013.01); *G06T 2207/30188* (2013.01)

(56) References Cited

U.S. PATENT DOCUMENTS

| | | | | |
|---|---|---|---|---|
| 2015/0022656 | A1* | 1/2015 | Carr | G06V 20/188<br>348/117 |
| 2020/0193589 | A1* | 6/2020 | Peshlov | G06V 10/955 |
| 2020/0202127 | A1* | 6/2020 | Chen | G06V 20/13 |
| 2022/0019795 | A1* | 1/2022 | Aune | G06N 3/045 |

* cited by examiner (a) 27 May 2021 (75.3%)

(b) 28 June 2021 (74.51%)

| Classes | Color | NDVI Scale | Color | NDVI Scale |
|---|---|---|---|---|
| Excellent | | 0.67~1.00 | | 0.34~0.67 |
| Good | | 0.00~0.34 | | 0.00~−0.34 |
| Poor | | −0.34~−0.67 | | −0.67~−1.00 |

FIGURE 5

RGB NIR NDVI (a) (b)

(b)

(a)

Python Program Codes to Predict the Plant Density

```
import cv2
import numpy as np
from matplotlib import pyplot as plt
img = cv2.imread('/Users/jingwenxue/PycharmProjects/PlantDensity/Library_GR_Clip.png')
# Step 1: Extract Extract just the green channel img
imgGreen = img[:,:,1]
# Step 2: Threshold the resulting gray scale image of the green channel
mask = np.zeros(imgGreen.shape, np.uint8)
# any pixel is higher than 140, turn them white.
mask[imgGreen > 90] = 255
ret, mask2 = cv2.threshold(imgGreen, 122, 255, cv2.THRESH_BINARY)
num_plant_pixels = np.sum(mask2 != 0)
plant_density = (num_plant_pixels/(mask2.shape[0] * mask2.shape[1])) * 100
print('Plant density: {0:.2f}'.format(plant_density), "%")
text = 'plant density:' + str('{0:.2f}'.format(plant_density)) + '%'
img = cv2.putText(img, text, (400, 600), cv2.FONT_HERSHEY_SIMPLEX, 1, (0, 0, 0), 2)
#text1 = 'white pixel percentage:' + str('{0:.2f}'.format(plant_density)) + '%'
#mask2 = cv2.putText(mask2, text1, (50, 100), cv2.FONT_HERSHEY_SIMPLEX, 1, (0, 0, 0), 2)
fig = plt.figure(figsize=(10, 7))
rows = 1
columns = 2
fig.add_subplot(rows, columns, 1)
plt.imshow(cv2.cvtColor(mask2, cv2.COLOR_BGR2RGB))
plt.axis('off')
fig.add_subplot(rows, columns, 2)
plt.imshow(cv2.cvtColor(img, cv2.COLOR_BGR2RGB))
plt.axis('off')
plt.show()
```

FIGURE 10

SYSTEM FOR INSPECTING AND EVALUATING A GREEN INFRASTRUCTURE

CROSS-REFERENCE TO RELATED APPLICATIONS

This application is based upon and claims the benefit of U.S. Provisional Application No. 63/471,090 titled "Method to Inspect and Evaluate a Green Infrastructure System," filed with the United States Patent & Trademark Office (USPTO) on Jun. 5, 2023, the specifications of which are incorporated herein by reference in its entirety.

FIELD OF THE INVENTION

The invention relates to evaluation of density and health of green infrastructures.

BACKGROUND OF THE INVENTION

Rapid urbanization, aging infrastructure, and climate change impacts have put a stress on existing stormwater drainage systems, and one commonly used solution to solve these challenges is green infrastructure (GI), including GI specific to stormwater management. GI represents an innovative approach to stormwater management with three primary functions: mitigating stormwater runoff, controlling floods, and improving water quality. GI encompasses features such as bioretention areas, rain gardens, bioswales, green roofs, permeable pavements, green spaces, and wetlands, all of which utilize vegetation, substrate (or media), soils, and natural processes. GIs have numerous environmental, social, and economic benefits, including stormwater-runoff reduction, air-quality improvement, heat-island-effect reduction, carbon storage and sequestration, resilience of drainage-system improvement, pollutant reduction, water-quality improvement, urban beautification, land-value increment, and energy-demand reduction. Consequently, there is a global surge in interest and implementation of GIs aimed at mitigating adverse impacts such as flooding, waterway contamination, and stream degradation. This is achieved by disconnecting the expanding impervious surfaces such as pavements and rooftops in the cities from the storm sewer systems.

Plants play an integral part and multifaceted role within GIs and contribute to various environmental, ecological, and aesthetic functions. A modeling study using hourly meteorological and pollution concentration data from across the US demonstrate the substantial air-pollution-removal capacity of urban trees for pollutants such as O3, NO2, SO2, and CO, thereby enhancing urban air quality. Additionally, vegetation is widely acknowledged as a particulate matter (PM)-removal solution in cities, taking various forms of green infrastructure. Plants contribute to the improvement of runoff quality by removing nutrients (nitrogen and phosphorus), heavy metals, total suspended solids (TSS), pathogens, emerging contaminants, and organic pollutants. They also enhance hydrological performance by preventing substrate clogging, mitigating stormwater volume infiltration and evapotranspiration, mitigating erosion, and influencing preferential flow paths. Furthermore, plants in green stormwater infrastructures (GSI) offer additional benefits such as urban greening (enhancing aesthetics), creating habitats for insects and diverse species, and further enhancing air quality. The effectiveness of GSIs is contingent upon several factors, including plant traits (e.g., plant density), plant health, plant species, soil properties, media types, and retention time. Integrated studies of the impact of trees on air pollution suggest that management of plant canopy cover (also referred to as plant density) could serve as a viable strategy for enhancing air quality and achieving clean air standards. Moreover, the morphological traits of plants (e.g., root structure and plant canopy architecture) play a crucial role in managing the hydrological cycle. Increased vegetation cover is correlated to increased environmental and ecological co-benefits such as habitat enhancement and bird species richness. Conversely, low plant density increases the risk of weed invasion and subsequently escalates maintenance costs.

Plant density is a critical factor in crop growth and yield, exerting influence over both inter- and intraspecific competition for vital resources (e.g., water, nutrients, and radiation). Traditionally, monitoring plant density relied on ground-level counts conducted within quadrats or segmented areas. Manual plant counting in the field is labor-intensive and disruptive, rendering it impractical for large-scale assessments.

Healthy plants not only optimize the functionality of GSIs, but also contribute to the attractiveness of facilities to the public and the appreciation of property values.

SUMMARY OF THE INVENTION

This invention employs unmanned aerial vehicles (UAV) in the collection of images and includes an integrated framework for evaluating plant density and health within GIs.

In this study, an integrated framework was developed and implemented to calculate plant density and evaluate the health of plants within GIs at the Morgan State University (MSU) campus in Baltimore, MD using UAV-based imagery. A DJI Phantom 4 Pro drone, equipped with a 20-megapixel camera and a Survey3N near infrared (NIR) 12 MP camera, were utilized to capture both UAV-based red, green, blue (RGB) and NIR images. Additionally, WebODM, ArcMap, PyCharm, and Canopeo were integrated into the framework for the evaluation process. The results indicated that the programming codes successfully predicted plant density with relatively low errors and high R2 values. The plant density of components (e.g., trees, grass, soil, and unhealthy trees) as well as of entire bioretention and green-roof sites, were evaluated. The Normalized Difference Vegetation Index (NDVI) results revealed that the Calvin And Tina Tyler Hall (CTTH) building at MSU had a higher NDVI value than the Center for Build Environment & Infrastructure Studies (CBEIS) engineering building, possibly due to its later construction and proper maintenance practices. Meanwhile, the lower plant density and NDVI values suggested the necessity for implementing a proper maintenance plan for the GIs. Plant health is critical to mitigate stormwater runoff, control the floor, improve water quality, increase attractiveness of facilities to the public, and appreciate property values. This study demonstrated the potential of using this framework to calculate plant density and monitor the plant health using UAV imagery, providing a rapid and cost-effective tool for assessing the plant performance of the rapidly growing GIs.

Accordingly, there is presented according to the invention, a computer-implemented system for assessment of green infrastructure comprising:

an unmanned aerial vehicle (UAV), a visible light image capture device mounted on the UAV, an infrared image capture device mounted on the UAV, a user interface, a computing device in electronic communication with the UAV, the visible light image capture device and the infrared image capture device, the computing device comprising at least one processor and at least one non-transient memory, the non-transient memory comprising:

a UAV on-board navigation module including computer-readable instructions which when executed by the at least one processor control movement of the UAV, a UAV remote control module including computer-readable instructions which when executed by the at least one processor cause the user interface to prompt a user for flight path instructions and transmit the flight path instructions to the UAV on-board navigation system, a red, green, blue (RGB) image capture device control module including computer readable instructions which when executed by the at least one processor control the visible light image capture device to capture visible light images according to pre-determined or user-set visible light image capture parameters, a near infrared (NIR) image capture device control module including computer readable instructions which when executed by the at least one processor control the NIR image capture device to capture infrared images according to pre-determined or user-set infrared image capture parameters, an image processing module including computer readable instructions which when executed by the at least one processor generates a geometrically corrected composite RGB image using the RGB images and a geometrically corrected composite NIR image using the NIR images, a geographic mapping module containing computer readable instructions, which when executed by the at least one processor generate a cropped composite RGB image and a cropped NIR image using the composite RGB image and the NIR image, respectively, and mapping data received from the user interface, a plant density database including a set of plant density rules that associate RGB image color profiles with plant density, a plant density prediction module, including computer readable instructions which when executed by the at least one processor apply the set of plant density rules to color profiles of the cropped composite RGB image to produce one or more plant density predictions, a plant health database including a set of plant health rules that associate NIR image profiles with plant health, a plant health prediction module, including computer readable instructions which when executed by the at least one processor apply the set of plant health rules to infrared profiles of the cropped composite NIR image to produce one or more plant health predictions, a plant improvement and maintenance database, including a set of plant improvement and maintenance rules that associate the plant density and the plant health rules to a corresponding set of plant improvement and maintenance recommendations, a management module, including computer readable instructions which when executed by the at least one processor: cause the user interface to prompt the user to enter the RGB image capture parameters, the NIR image capture parameters, and the mapping data, cause the user interface to transmit the RGB image capture parameters to the RGB image capture device control module, cause the user interface to transmit the NIR image capture parameters to the NIR image capture device control module, cause the RGB image capture device to transmit the RGB images to the image processing module, cause the NIR image capture device to transmit the NIR images to the image processing module, cause the user interface to transmit the map data to the geographic mapping module, cause the composite RGB image and the composite NIR image to be sent to the geographic mapping module, cause the cropped composite RGB image and the cropped composite NIR image to be sent to the plant density prediction module and to the plant health prediction module, and transmit one or more the plant health improvement and maintenance recommendations to a user device.

As used herein, the term “module” refers to one or more lines of code. The lines of code may be custom authored code, commercially available code, and/or combinations thereof.

According to further embodiments of the invention, the RGB image capture device and the NIR image capture device may be integrated into a single image capture device. The computing device may be made up of a network of distributed processors and non-transient memories. The image processing module may optionally include WebOpenDroneMap (WebODM); the geographic mapping module may optionally include ArcMap; the plant density prediction module may optionally include Canopeo, and the plant health prediction module may optionally include ArcMap.

BRIEF DESCRIPTION OF THE DRAWINGS

The patent or application file contains at least one drawing executed in color. Copies of this patent or patent application publication with color drawing(s) will be provided by the Office upon request and payment of the necassary fee.

The numerous advantages of the present invention may be better understood by those skilled in the art by reference to the accompanying drawings in which:

FIG. 5 shows ranges of NDVI values for plant conditions. Three sets of colors and associated NDVI scales are used to precisely distinguish the plant health conditions of each class (excellent, good, and poor).

FIG. 10 shows the PyCharm programming codes used in Example 1 hereinbelow.

DETAILED DESCRIPTION OF THE INVENTION

The following tools and software were used to evaluate the plant density and health within the GSIs:

(1) DJI Phantom 4 Pro drone (resolution: 4096×2160), controller, Secure Digital (SD) card, and charged battery pack;

(2) MAPIR Survey3N NIR camera and SD card;

(3) MAPIR Camera Control (MCC) software (v2019.10.16);

(4) iPad (DJI GS Pro app included);

(5) WebOpenDroneMap (WebODM);

(6) ArcMap;

(7) PyCharm; and (8) Canopeo.

The DJI Phantom 4 Pro drone (DJI, Shenzhen, China) has a 20-megapixel camera with a focal length of 8.6 mm, a lens FOV of 84°, a CMOS sensor size of 1 inch, and it captures images at ISO-100 with a shutter speed of 1/320 s.

The Survey3N NIR 12 MP camera (MAPIR, San Diego, CA, USA) has a focal length of 8 mm, a 41° FOV, and imagery captured at ISO-400 with a shutter speed of 1/500 s. The Survey3N takes pictures every 0.5 s during the flight and saves the photos in RAW image format. Using the MAPIR Camera Control software, the data from the image RAW files and the Global Navigation Satellite System (GNSS) data stored with the image files are combined.

The DJI GS Pro app on an iPad was used for designing an appropriate flight plan of each studied site.

WebODM is an open-source drone mapping software that was implemented to generate orthorectified maps, point clouds, and digital surface models (DSMs) from aerial imagery using image processing libraries including OpenSfM and Primitive Machine Vision System (PMVS).

ArcMap was used to view, edit, and analyze geospatial data and maps, while PyCharm is an integrated development environment (IDE) which was used in computer programming, specifically for the Python programming language and codes. Python (version 3.9.13) along with libraries (e.g., numpy, cv2, pyplot) were used for developing the framework, and alternative code (e.g., Visual Studio Code) can be used based on individual skills, availability, and familiarity.

Figure 1:
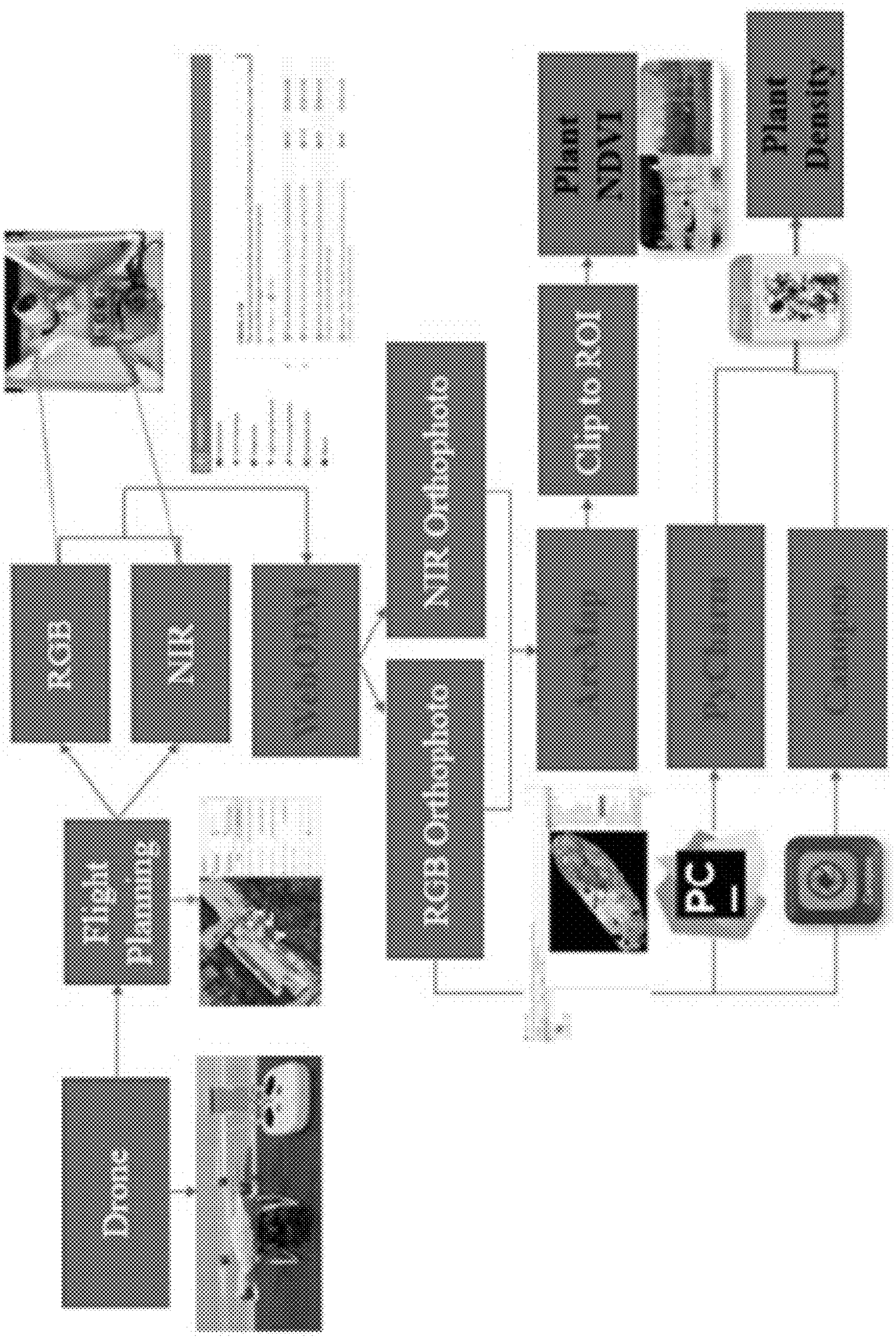
FIG. 1 is a schematic diagram of a framework for plant density and health identification according to an embodiment of the invention.

FIG. 1 depicts a schematic diagram outlining the workflow for estimating plant density and evaluating the plant health according to an embodiment of the invention. There are three major stages involved in plant density and health evaluation according to the invention. The first stage involves programming a flight path for a camera-enabled UAV, having the drone navigate the programmed flight path, with the camera taking the programmed images, and retrieving/downloading the images. In the exemplary embodiment described herein, the DJI GS Pro app was used to generate flight paths for the drone to automatically capture UAV-based imagery. During flight planning, various flight and image capture parameters may be configured to optimize image quality and reliability. The flight capture parameters may include flight height, front and side overlap ratio, flight path parallel to the boundary of bioretention, and estimated flight duration. Image capture parameters may include total image quantity to assign drones to fly along the designated path, autonomously capturing images in sequence. For instance, in the exemplary embodiment described herein, imagery was acquired at an altitude of 35.05 m (115 feet) and at a speed of 1.83 m per second (4.1 miles per hour) with front and side overlap of 90% and 95%, respectively, following a lawn mower pattern to ensure comprehensive coverage. This high-overlap setting ensured that the NIR camera mounted on the drone captured imagery with sufficient overlap to facilitate accurate data collection and processing. In the exemplary embodiment, two cameras were used, a DJI-drone-equipped RGB camera and an additional mounted MAPIR camera, and two sets of images were collected: red, green, blue (RGB) from the DJI-drone-equipped RGB camera and NIR images from the MAPIR camera and. There were two file formats of raw data in the SD cards from both cameras: (1) RAW format, preserving pixel information and (2) JPG format, containing metadata. Both files are preferably used to process the TIFF output and create NIR images.

Figure 2:
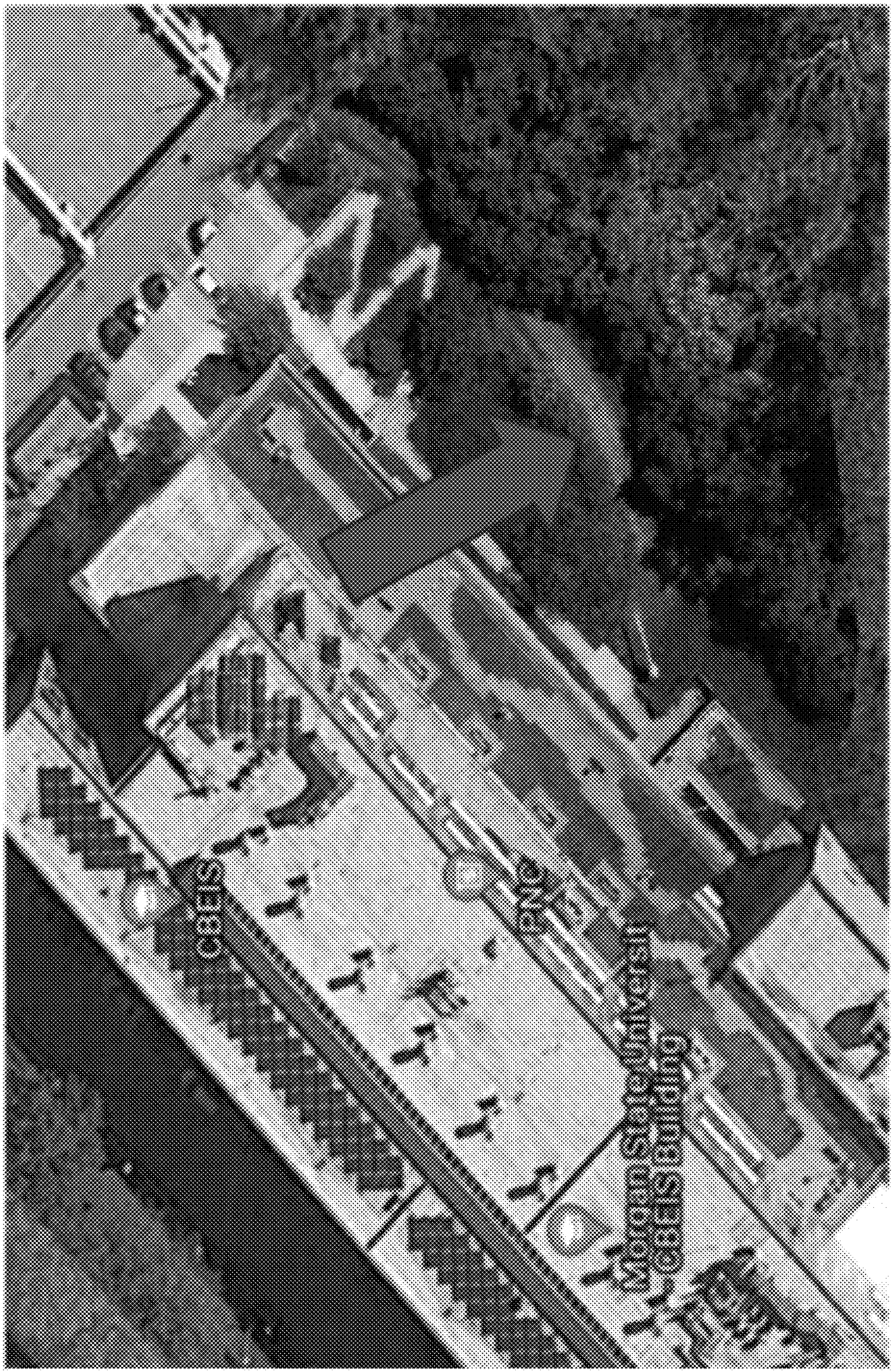
FIG. 2 is a UAV-based RGB orthophoto of GSIs at MSU’s CBEIS building.

The second stage of the invention involves pre-processing of the captured images into orthophotos. In the exemplary embodiment, the pre-processing was carried out using by WebOpenDroneMap (WebODM) Software (v1.9.2). After checking, sorting, and integrating the input RGB and NIR images, each set of images is separately imported to image processing software to create one or more orthophotos (an aerial photograph geometrically corrected to provide uniform scale) of the entire flight area. In the exemplary embodiment, WebODM software (v1.9.2) was used. In the exemplary embodiment, default settings were applied for generating high-resolution orthomosaics (a mosaic of adjacent or overlapping orthophotos) to obtain two orthophotos covering the entire flight path for each flight. One orthophoto was the RGB orthophoto from the Phantom 4 Pro CMOS camera and the other orthophoto was the NIR orthophoto from the Survey3N NIR camera. The orthomosaic was generated at a resolution of 1 cm/pixel, chosen to minimize distortion in the orthomosaic and ensure adequate detail for further analysis. Then, a JPG image was created for motion structure processing using WebODM software. FIG. 2 shows the UAV-based RGB orthophoto (about 30 images were generated) of GSIs within the campus. The UAV-based image notably exhibits superior resolution (as highlighted with the red arrow) and sensitivity compared to surrounding areas captured by Google Maps, which relies on satellite and aerial imagery to create detailed maps and images of the GSIs.

The third step involves predicting plant density and evaluating plant health based on the orthophotos. In the exemplary embodiment, the Canopeo application and PyCharm software (v2020.3.3) were used in conjunction with ArcMap software (v10.8.1). The ArcMap software was used to crop RGB and NIR orthophotos to identical regions of interest (ROIs), focusing exclusively on the GSI areas. The cropped RGB orthophoto was imported into PyCharm software to obtain the plant density percentage using the Python programming codes (FIG. 10). In the provided programming code, a pixel intensity value threshold was established to convert green pixels into white and the rest of the pixels into black. The number of white pixels over total pixel numbers was counted to obtain the plant density percentage. The cropped RGB images were also imported into the Canopeo application to analyze plant density. The predicted plant density results from PyCharm program codes and the calculated values from the Canopeo application were compared. Three statistical parameters, average absolute error (AAE), average biased error (ABE), and coefficient of determination ($R^2$), were employed to evaluate the accuracy and suitability of the program code (FIG. 10). Estimation errors, such as ABE, quantify the degree of overestimation and underestimation of models, while AAE measures the degree of closeness between the predicted and measured results. $R^2$ value is widely used in statistical and regression analyses to determine the degree of goodness and accuracy of program code. All the estimation errors and $R^2$ were derived from equations listed below:

$$AAE = \frac{\left(\sum_{i=1}^{n} \frac{|P_i - M_i|}{M_i}\right)}{n} \times 100\%, \tag{1}$$

where P, M, i, and n represent predicted results, measured results, specific sample $$ABE = \frac{\left(\sum_{i=1}^{n} \frac{(P_i - M_i)}{M_i}\right)}{n} \times 100\%, \tag{2}$$

$$R^2 = 1 - \frac{\sum_{i=1}^{n} (P_i - M_i)^2}{\sum_{i=1}^{n} (M_i - \overline{M})^2}, \tag{3}$$

number, and total number of samples, respectively. Physical measurement of plant density in the field is challenging and labor-intensive due to irregular shapes and unclear boundaries. Therefore, the estimated results from the Canopeo application were assumed and adopted to be the measured results, as the Canopeo application is well known to have relatively high accuracy. Results from the PyCharm Software were used as predicted results. Prediction was considered accurate if the estimation errors, AAE and ABE, tended toward zero and the $R^2$ value approached 1.

To estimate plant health, the ArcMap software was utilized to generate NDVI maps, classify NDVI ranges, and extract NDVI values based on the formula, NDVI=(NIR-RED)/(NIR+RED), where NIR stands for the near-infrared spectral band and RED stands for the red spectral band. The NDVI maps were calculated and generated through ArcToolbox and the Image Analysis Function within ArcMap software.

Example 1

The study was conducted on the campus of Morgan State University (MSU), situated in the Baltimore City, Maryland, USA. As shown in Table 1, there are several types of GSIs, also known as best management practices (BMPs), including bioretention, green roofs, rain gardens, permeable pavements, and ponds (there were more than 41 GSIs, and 20 of these are summarized).

TABLE 1

Summary of GSIs at Morgan State University

| No. | Name | GSI Type | MD_North[1] | MD_East[1] | Year Built | Coordinatex (Latitude, Longitude) | Collection Dale (2021) |
|---|---|---|---|---|---|---|---|
| 1 | CBEIS #1 | Bioretention | 187,162.20900 | 436,344.28000 | 2012 | 39.351953, −76.578343 | — |
| 2 | CBEIS #2 | Bioretention | 187,113.57600 | 436,268.57600 | 2012 | 39.351518, −76.579224 | 27 May/28 June |
| 3 | CBEIS #3 | Bioretention | 187,230.99400 | 436,342.13500 | 2012 | 39.352573, −76.578364 | — |
| 4 | CBEIS | Green roof | 187,076.04700 | 436,213.66600 | 2012 | 39.351183, −76.579863 | 3 September |
| 5 | CBEIS | Permeable pavement | 187,224.81000 | 436,334.30700 | 2012 | 39.352517, −76.578455 | — |
| 6 | CBEIS | Oil/grit separator | 187,178.68400 | 436,284.47300 | 2012 | 39.352104, −76.579036 | — |
| 7 | GSBM | Bioretention | 185,898.43700 | 435,461.47700 | 2015 | 39.340606, −76.588651 | — |
| 8 | GSBM | Green roof | 185,956.83500 | 435,517.33600 | 2015 | 39.341130, −76.588000 | 3 September |
| 9 | BSSC[2] #1 | Micro-bioretention | 186,040.89000 | 435,446.26600 | 2017 | 39.341890, −76.588820 | — |
| 10 | BSSC #2 | Micro-bioretention | 186,028.51900 | 435,410.97700 | 2017 | 39.341780, −76.589230 | — |
| 11 | BSSC #3 | Micro-bioretention | 186,024.34600 | 435,470.47900 | 2017 | 39.341740, −76.588540 | — |
| 12 | BSSC | Green roof | 186,009.97200 | 435,483.47500 | 2017 | 39.341610, −76.588390 | — |
| 13 | LB 3 | Micro-bioretention | 186,020.65200 | 435,617.57800 | 2017 | 39.341701, −76.586834 | — |
| 14 | ESRL | Green roof | 186,325.25200 | 435,724.28700 | 2007 | 39.344440, −76.585580 | 3 September |
| 15 | CTTH | Micro-bioretention | N/A | N/A | 2020 | N/A | 29 May |
| 16 | CTTH | Rain garden | N/A | N/A | 2020 | N/A | — |
| 17 | CTTH | Green roof | N/A | N/A | 2020 | N/A | 29 May |
| 18 | COMM[4] | Pond | 186,716.92100 | 435,964.39900 | 2006 | 39347958, −76.582774 | — |
| 19 | COMM | Permeable Pavement | 186,824.20600 | 435,978.10200 | 2006 | 39.348924, −76.582609 | — |
| 20 | AH[5] | Pond | 185,704.34600 | 435,902.97700 | 1922 | 39.338840, −76.583540 | — |

Note 1:

North and East are geographic points used to locate BMPs. Maryland requires the use of State Plane NAD 83 m for geographic location. Geographic Information systems (GIS) can be used to provide these coordinates.

Note 2:

Behavioral Social Science Center (BSSC).

Note 3:

Legacy Bridge (LB).

Note 4:

School of Global Journalism & Communication (COMM).

Note 5:

Alumni House (AH).

Figure 9:
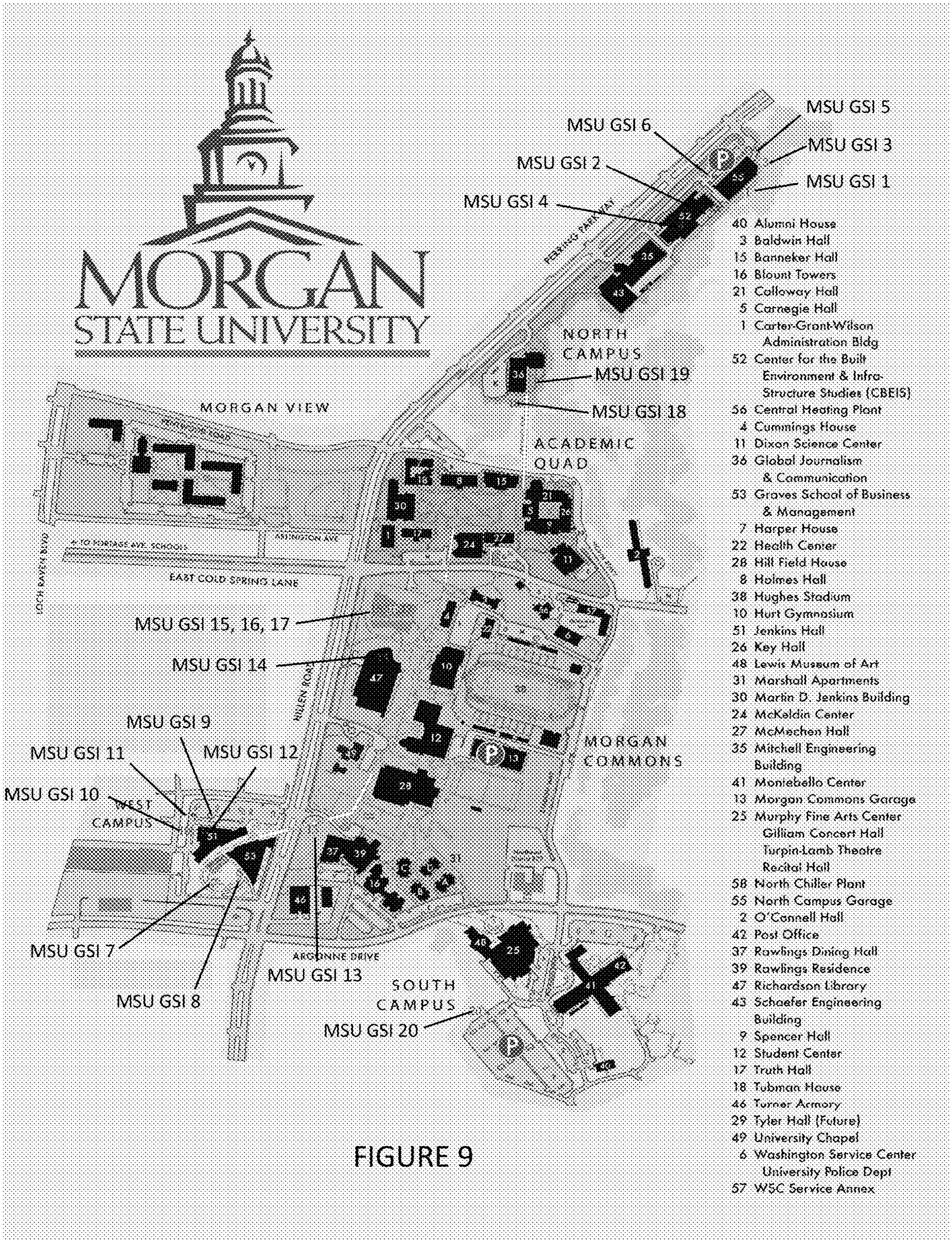
FIG. 9 is a Morgan State University campus map showing the GSI's surveyed in connection with Example 1 hereinbelow.

This study used selected specific components of GSIs, such as trees, grass, soil, and unhealthy trees, along with the entire area of the GSIs. For instance, bioretention (the Center for Build Environment & Infrastructure Studies (CBEIS)); green roofs (one at the Earl S. Richardson Library (ESRL) and another at the Graves School of Business and Management (GSBM)), as well as both micro-bioretention and a green roof (Calvin and Tina Tyler Hall (CTTH)) within the MSU Campus were selected for analysis. NAD83 coordinates (north and east points, units: meters, SPC zone: MD-1900) were converted into latitude and longitude (decimal degrees (DD) in Google Maps) using the National Geodetic Survey (NGS) coordinate conversion and transformation tool (NCAT). The number ID of GSIs within the MSU are labeled on the Morgan State University campus map of FIG. 9.

Plant Density Prediction and Validation

Figure 3:
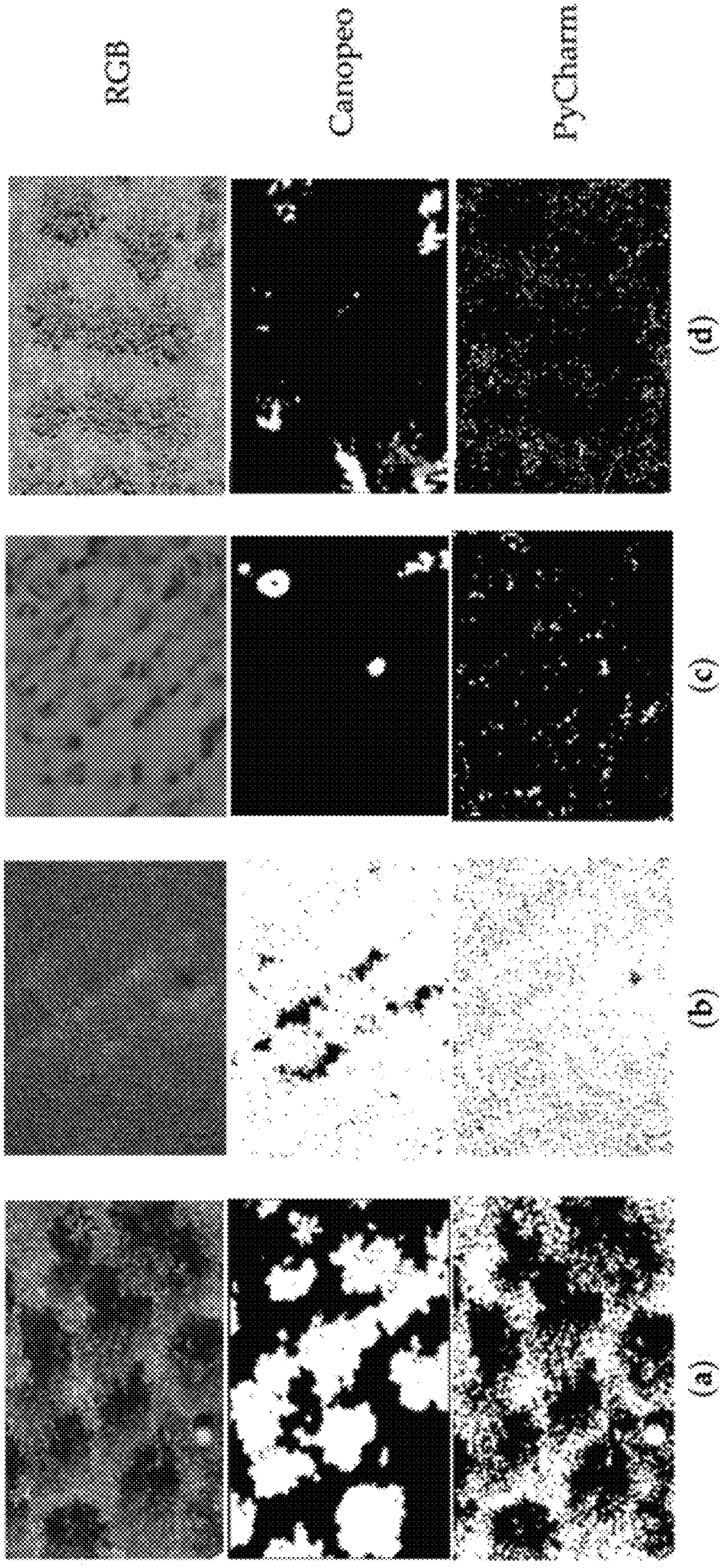
FIG. 3 shows plant density prediction for GSI components trees (a), grass (b), soil (c) and unhealthy trees (d). Vegetation is reflected by white pixels and other media is reflected in black pixels.

As depicted in first row of FIG. 3, RGB images of various GSI components, including trees, grass, soil, and unhealthy trees within the MSU Campus, were collected using the drone and extracted from the entire area of GSIs. Subsequently, these images underwent processing and were imported into the Canopeo application, which was developed to quantify canopy cover (or plant density) of green vegetation for any agricultural crop, turf, or grassland based on downward-facing photos. Green live vegetation appears as white pixels and other background elements appear as black pixels in Canopeo, which was the opposite case in code. Results from the Canopeo application in the second row revealed that the plant density percentages were 43.09, 94.69%, 2.51%, and 5.47% for the selected trees, grass, soil, and unhealthy trees, respectively. Additionally, plant density was predicted by self-developed programming codes (FIG. 10) in the PyCharm environment. In the last row of FIG. 3, the estimated plant densities using the programming code were 42.19%, 93.03%, 2.65%, and 4.96% for the selected trees, grass, soil, and unhealthy trees, respectively.

Figure 11:
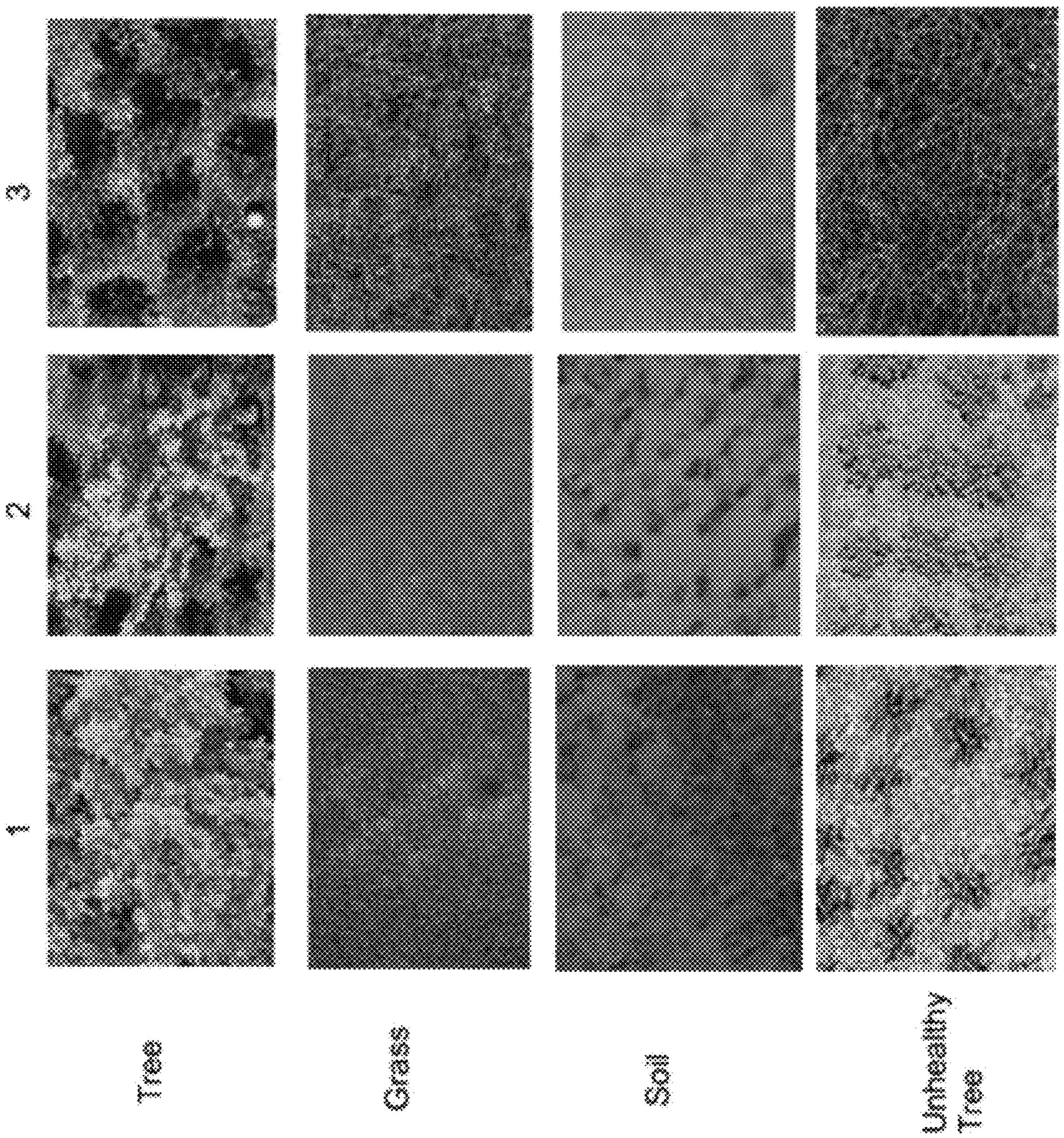
FIG. 11 shows selected examples of trees, grass, soil and unhealthy trees.

Plant density prediction between these two methods was very similar, with only a slight difference. Furthermore, three images were further analyzed for each component (FIG. 11), and the results are summarized in Table 2.

TABLE 2

Summary of error estimations for GSI components.

| Components | Canopeo (%) | Programming Code (%) | Threshold | Category |
|---|---|---|---|---|
| Tree1 | 96.51 | 95.50 | 40 | Tree |
| Tree2 | 69.97 | 65.90 | 70 | |
| Tree3 | 43.09 | 42.19 | 85 | |
| Grass1 | 94.69 | 93.03 | 50 | Grass |
| Grass2 | 100.00 | 100.00 | 40 | |
| Grass3 | 95.84 | 94.20 | 30 | |
| Soil1 | 0.02 | 0.03 | 105 | Soil |
| Soil2 | 2.51 | 2.65 | 113 | |
| Soil3 | 4.05 | 4.49 | 131 | |
| Unhealty_Tree1 | 0.14 | 0.13 | 231 | Unhealthy tree |
| Unhealty_Tree2 | 5.47 | 4.96 | 180 | |
| Unhealty_Tree3 | 0.79 | 0.80 | 131 | |

AAE = 0.080,
ABE = 0.032,
$R^2$ = 0.958

The number of each component (e.g., Tree1 vs. Tree2 vs. Tree3) of GSIs represents the different images collected at different regions. Threshold was used to identify pixels between plants and non-plants.

Errors, including ABE, AEE, and R2 were computed to validate the proposed method based on the computer vision techniques. In this method, the image is initially binarized to identify the green objects, which are then classified into plants based on the geometrical features. The results indicated that self-developed codes for plant density estimation had a high $R^2$ value of 99% and a relatively low estimation errors of 9.7% for AAE and 3.9% for ABE.

Figure 4:
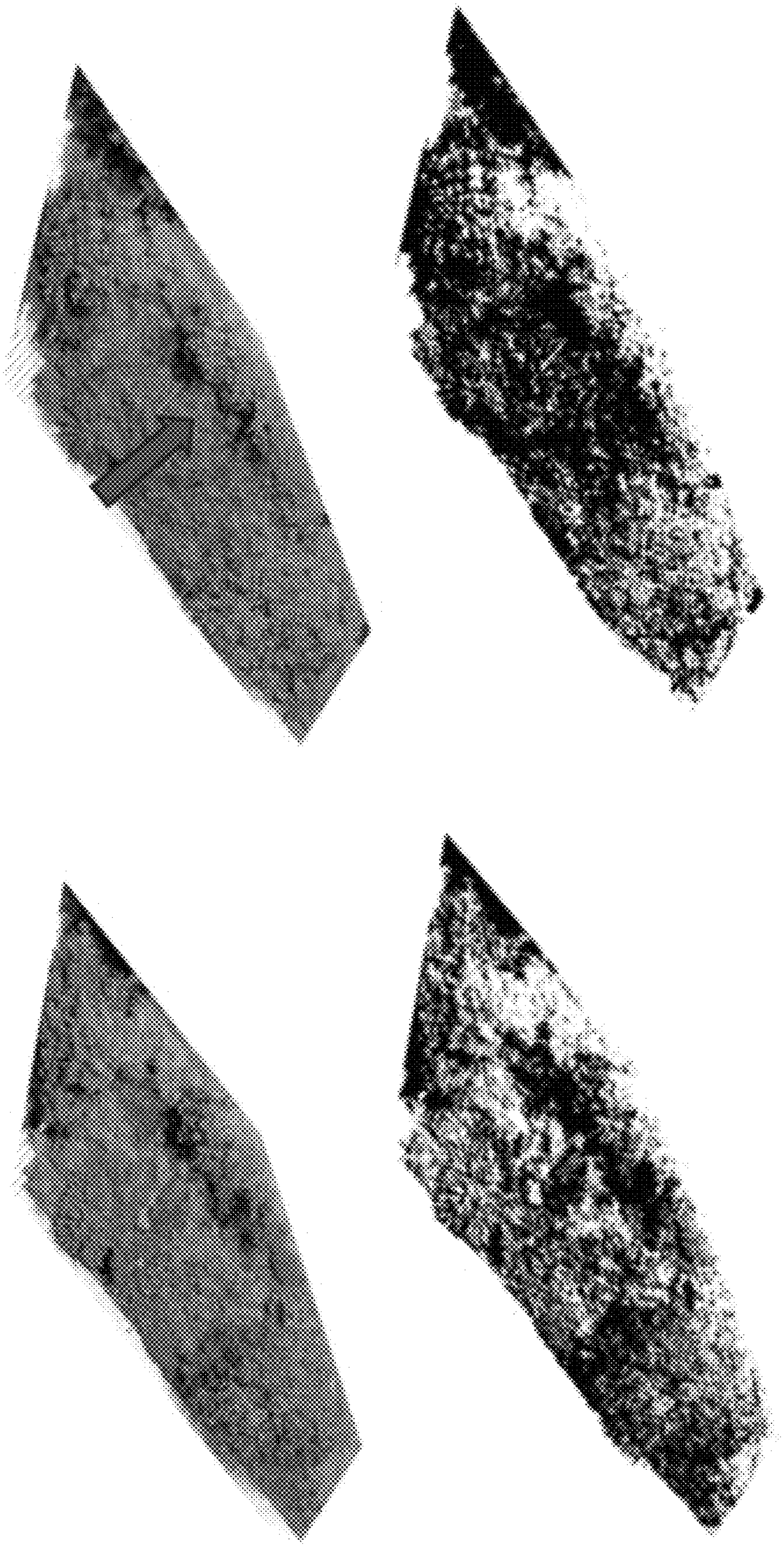
FIG. 4 shows plant density predictions of bioretention at Morgan State University’s campus on two different dates, one month apart.

A total of 30-50 RGB images were utilized to generate orthogonal images for two different periods. Then, program codes were implemented to assess the plant density of the entire GSI with multiple components (specifically, bioretention at the back side of the CBEIS building). As shown in FIG. 4, the results indicated that the plant density was 75.30% on 27 May 2021, and 74.51% on 28 Jun. 2021.

Normally, there might be slight increases in vegetation growth and plant cover from May to June. However, this study found a slight decrease in plant density, which was attributed to the expansion of a stagnant water area (highlighted in red arrow) and inadequate maintenance of GSIs. In the meantime, expansion of the stagnant area was also observed by visual inspection. Therefore, this study establishes a framework for estimating plant density within GSIs. These preliminary findings also provide an insight into the performing of future studies to collect additional UAV images monthly and annually to monitor the real-time changes in plant growth and to identify the necessary proper maintenance plans for the GSIs.

NDVI for Plant Health

Figure 6:
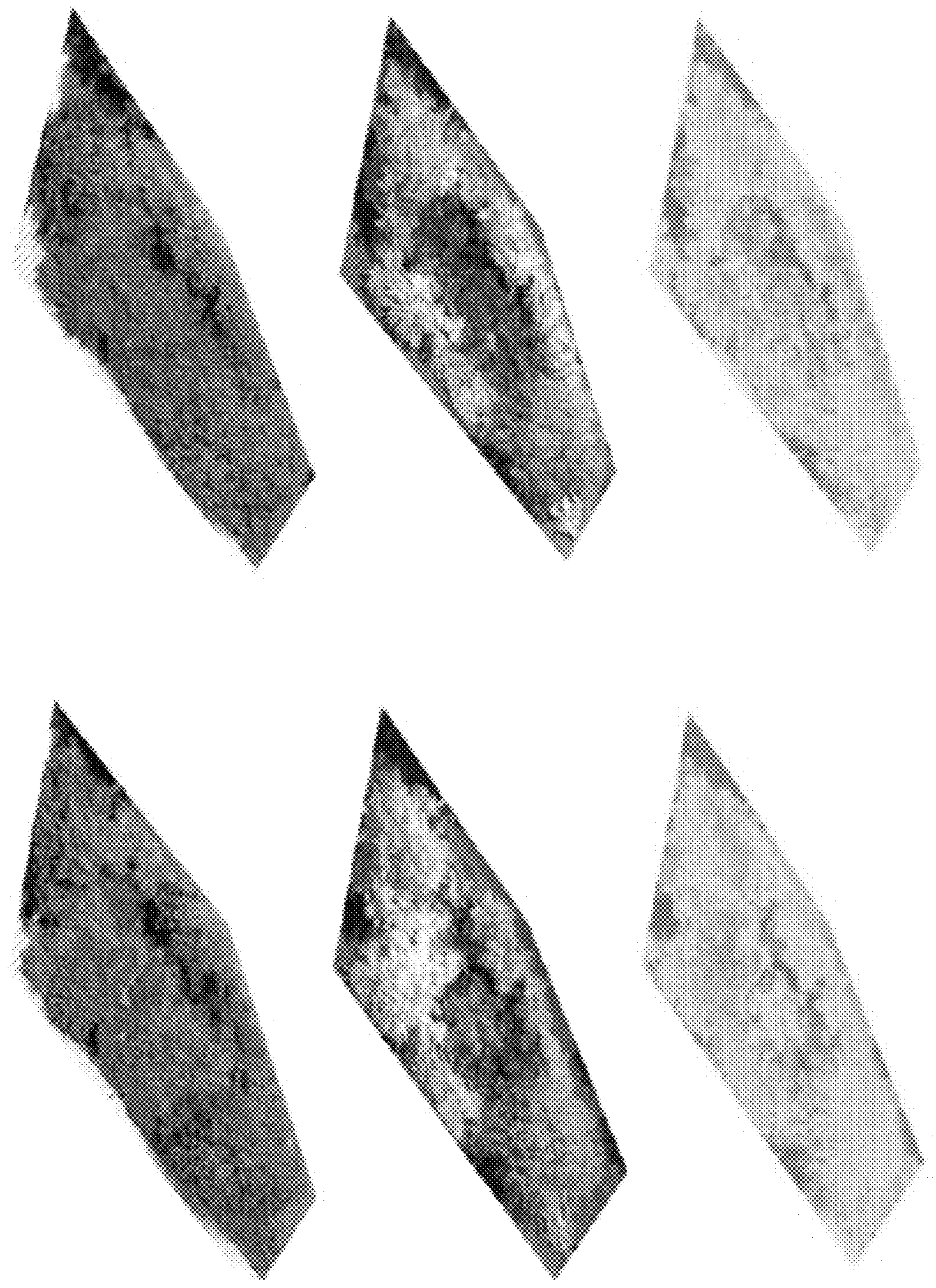
FIG. 6 shows RGB, NIR and NDVI maps of bioretention at Morgan State University’s Center for Build Environment & Infrastructure Studies building.

As presented in FIG. 5, this study determined NDVI values of plants within the GSIs using the multispectral images obtained from the UAV platform and categorized them into three plant-condition classes: excellent, good, and poor. The matching vegetation index color patterns at six levels depicted the three classes along the color scale ranging from −1.0 to 1.0. Additionally, minimal and maximal NDVI values were extracted and classified into classes, as detailed in FIG. 5. As shown in FIG. 6, RGB and NIR images were processed and used to generate NDVI maps. NDVI maps of the bioretention behind the CBEIS building of MSU campus were analyzed for two different time points (May and June in 2021). In these NDVI maps, green represents healthy vegetation, yellow indicates senescent or declining vegetation, orange and brown represent soil and dead vegetation, and red denotes the areas with no vegetation such as water bodies, buildings, pavements, equipment, and other hardscapes. For further exploration of the condition of orange and red areas in GSIs where NDVI values were less than 0, it is essential to investigate the presence of long-standing water, as this is a crucial issue affecting GSI performance. The central area of red color in the NDVI map increased from May to June. This was attributed to increased rainfall events in summer leading to stagnant water in the pond in the center area of this bioretention. Stagnant water in a pond not only results in decreased levels of dissolved oxygen, but also fosters the growth of harmful organisms, deteriorates water quality, and adversely affects plant (or grass) health. This observation suggests the need to consider appropriate plants and to replace typical plant and grass in the central area of the GSIs.

Example 2

Figure 7:
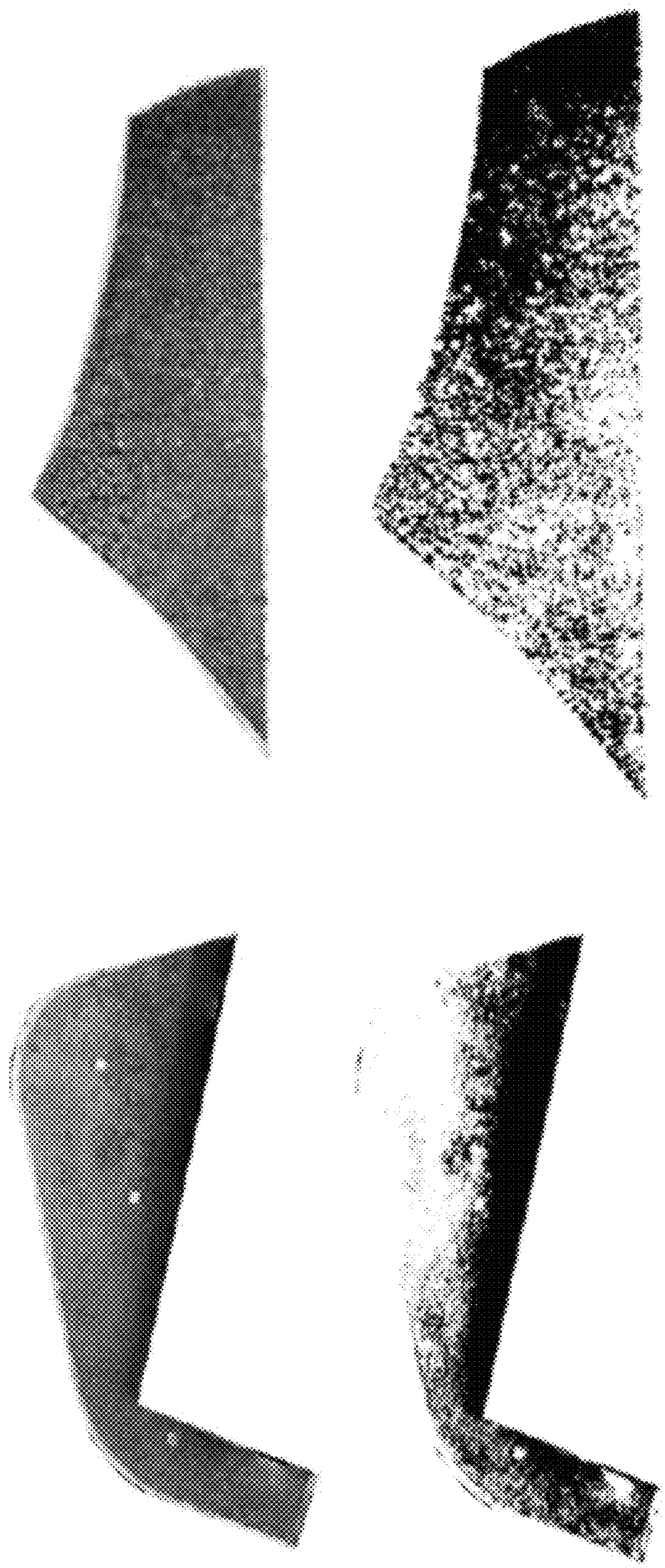
FIG. 7 shows plant density predictions at Morgan State University’s library building (a) and the green roof of Morgan State University’s business building (b).
Figure 8:
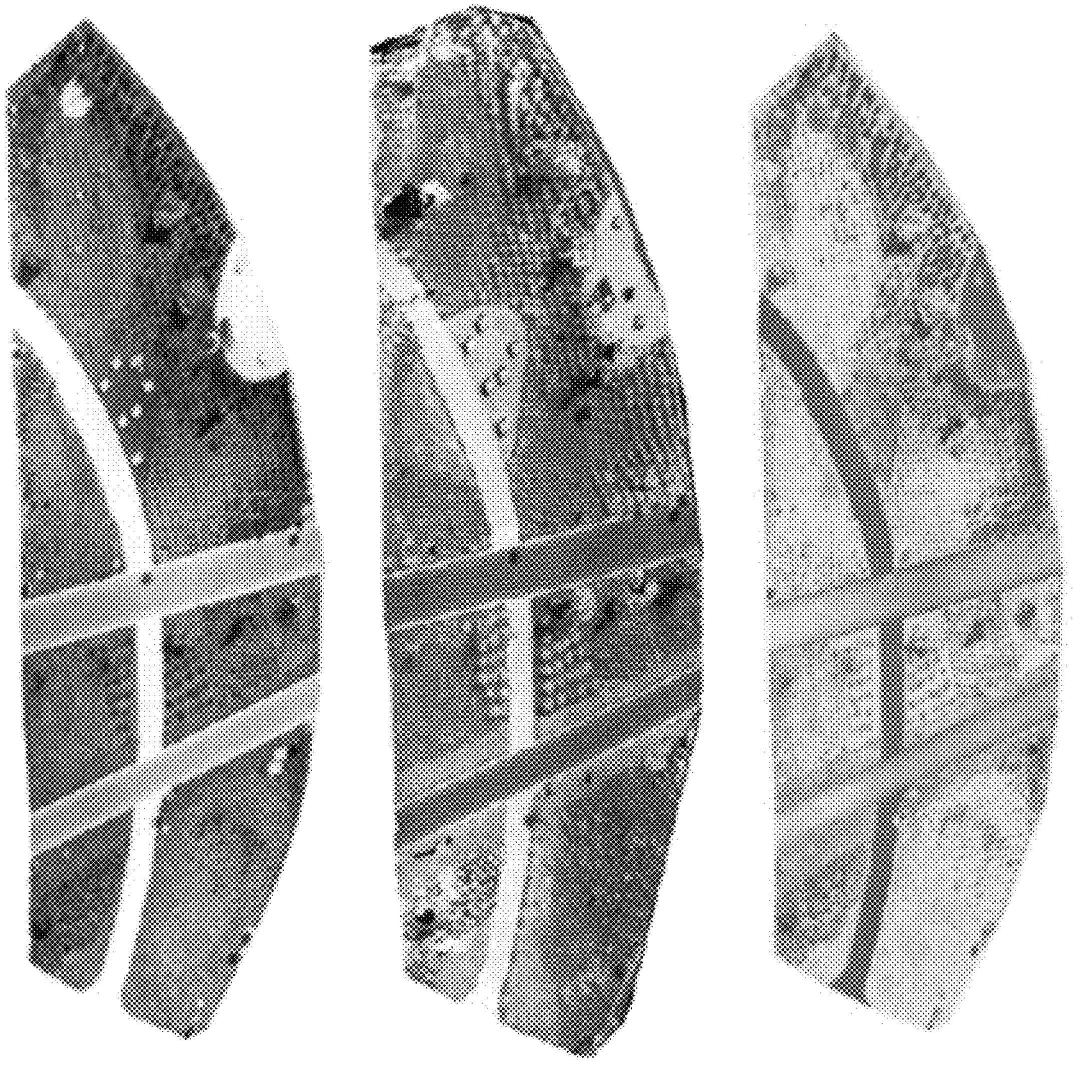
FIG. 8 shows RGB, NIR, and NDVI maps of GSI near Morgan State University’s Tyler Hall. Three sidewalks divide each image into six sections, sections 1-3 left to right across the top, and sections 4-6 left to right across the bottom.

Based on the validated plant density identification and NDVI calculation methods described herein, additional GSI sites, including the green roof of the Morgan State University library (ESRL) and the green roofs of the business school (GSBM) and Tyler Hall (CTTH) were evaluated and are presented in FIGS. 7 and 8. The results indicated that plant density of the green roof in the library building was 72.76%, slightly lower than the bioretention of the CBEIS building (ranging from 75.30% to 74.51%). This variance can be attributed to the age of the GSIs—the green roof of the library was constructed in 2007, while the bioretention of CBEIS was constructed in 2012. In contrast, the green roof of the business school was built later than that of the CBEIS (in 2015). However, the plant density value (63.63%) was lower than the CBEIS bioretention, likely due to limited maintenance since its construction. Typically, the green roofs require extra maintenance, including watering, fertilizing, and weeding, to maintain proper plant coverage and functionality (e.g., thermal performance, environment, and air quality). Compared with the NDVI map of CBEIS (in FIG. 6), MSU Tyler Hall (FIG. 8) exhibits dark green and dense green areas. This observation leads to the conclusion that the MSU Tyler Hall (built in 2020) has more healthy plants. However, there was a significant area of yellow which likely represents soil or sidewalks. In FIG. 8, this suggests the need to add additional plants in sections 2-5 compared with sections 1 and 6, and to increase the plant coverage areas to reduce the volume of stormwater discharges, reduce urban heat island effects, and improve air quality. These results underscore that the age of a building, as well as proper maintenance, are crucial factors for achieving higher plant density and better plant health in the GSIs.

Example 3

Comprehensive evaluation of plant density and plant health may include application of fuzzy logic. In the context of the present invention, fuzzy logic may also be particularly useful in the identification and enumeration of invasive plant species. According to this embodiment, each evaluation factor (e.g., plant density, plant health and invasive species count) may have three grades v1, v2, and v3, where v1 indicates that conditions are compromised and require key maintenance, v3 indicates that the conditions are relatively good, and v2 reflects that conditions are relatively satisfactory and require only scheduled maintenance.

The inspection and analysis results of evaluation factors will be used to determine the fuzzy relation matrix R=[r11, r21, r31; r12, r22, r32; . . . ; r1n, r2n, r3n].

Since every factor's status is not necessarily equal, a weighting coefficient may be applied, where a weight coefficient set A={a1, a2, . . . , an} represents the weight coefficient of every factor.

TABLE 3

Index Classification Standard and Weight of the Evaluation Factors Index

| Evaluation | Weight | Evaluation Grade V | | |
|---|---|---|---|---|
| Index U | Coefficient A | v1 | v2 | v3 |
| Plant Density | 0.35 | <30 | 30-70 | >70 |
| Plant Health | 0.47 | <0.25 | 0.25-0.65 | >0.65 |
| Invasive Plant Number | 0.18 | >10 | 1-10 | 0 |

Therefore, a comprehensive evaluation set, B may be calculated as B=A×R={b1, b2, . . . , bn}. Overall green infrastructure performance may be scored as good (90) for high grade, normal (50) for medium grade, and bad (10) for low grade. Thus, the final score of the selected GI will be calculated by multiplication of the elevation set B and score matrix S.

The present invention, therefore, is an innovative, efficient, economical, easy, rapid, and high accuracy inspection and evaluation system to generate a score for the GI instead of using the traditional manual check lists. GI include urban agriculture, green walls, urban woodlands, suburban street trees, sensitive urban design, green roofs, parks, gardens, golf courses, and city street trees. Based on the constructed database and calculated overall score, it can have multiple applications, including guidance to establish and implement GI performance verification protocols, adaptive management that assures desired long-term outcomes while reducing the uncertainty found in natural systems and human behaviors, and providing proper inspection and maintenance schedules to extend GI life cycle. Ultimately, it will improve new GIs' design and maintain existing GIs. In the long-term view, it can also be used as a decision making model for engineering and landscape consultants and benefit local and state government.

The invention claimed is:

1. A computer-implemented system for assessment of green infrastructure comprising:

a. an unmanned aerial vehicle (UAV), b. a visible light image capture device mounted on said UAV, c. an infrared image capture device mounted on said UAV, d. a user interface, e. a computing device in electronic communication with said UAV, said visible light image capture device and said infrared image capture device, said computing device comprising at least one processor and at least one non-transient memory, f. said non-transient memory comprising:

a plant density database including a set of plant density rules that associate RGB image color profiles with plant density, a plant health database including a set of plant health rules that associate NIR image profiles with plant health, and a plant improvement and maintenance database, including a set of plant improvement and maintenance rules that associate said plant density rules and said plant health rules to a corresponding set of plant improvement and maintenance recommendations, g. said non-transient memory further comprising computer-readable instructions which when executed by said at least one processor:

control movement of said UAV, cause said user interface to prompt a user for flight path instructions and transmit said flight path instructions to said UAV, control said visible light image capture device to capture visible light images according to pre-determined or user-set visible light image capture parameters, control said NIR image capture device to capture infrared images according to pre-determined or user-set infrared image capture parameters, generate a geometrically corrected composite RGB image using said RGB images and a geometrically corrected composite NIR image using said NIR images, generate a cropped composite RGB image and a cropped NIR image using said composite RGB image and said NIR image, respectively, and mapping data received from said user interface, apply said set of plant density rules to color profiles of said cropped composite RGB image to produce one or more plant density predictions, apply said set of plant health rules to infrared profiles of said cropped composite NIR image to produce one or more plant health predictions, h. said non-transient memory further comprising computer-readable instructions which when executed by said at least one processor:

cause said user interface to prompt said user to enter said RGB image capture parameters, said NIR image capture parameters, and said mapping data, cause said user interface to transmit said RGB image capture parameters to said RGB image capture device control module, cause said user interface to transmit said NIR image capture parameters to said NIR image capture device control module, cause said RGB image capture device to transmit said RGB images to said image processing module, cause said NIR image capture device to transmit said NIR images to said image processing module, cause said user interface to transmit said map data to said geographic mapping module, cause said composite RGB image and said composite NIR image to be sent to said geographic mapping module, cause said cropped composite RGB image and said cropped composite NIR image to be sent to said plant density prediction module and to said plant health prediction module, transmit one or more said plant health improvement and maintenance recommendations to a user device.

2. The computer-implemented of claim 1, wherein said RGB image capture device and said NIR image capture device are integrated into a single image capture device.

3. The computer-implemented system of claim 1, wherein said computing device comprises a network of distributed processors and non-transient memories.

4. The computer-implemented system of claim 1, wherein said image processing module comprises WebOpenDroneMap (WebODM).

5. The computer-implemented system of claim 1, wherein said geographic mapping module comprises ArcMap.

6. The computer-implemented system of claim 1, wherein said plant density prediction module comprises Canopeo.

7. The computer-implemented system of claim 1, wherein said plant health prediction module comprises ArcMap.

* * * * *